(12) United States Patent
Velusamy

(10) Patent No.: US 9,417,312 B2
(45) Date of Patent: Aug. 16, 2016

(54) SYSTEM AND METHOD FOR PROVIDING AUTOMATIC LOCATION-BASED IMAGING USING MOBILE AND STATIONARY CAMERAS

(75) Inventor: Umashankar Velusamy, Tampa, FL (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 722 days.

(21) Appl. No.: 13/171,031

(22) Filed: Jun. 28, 2011

(65) Prior Publication Data

US 2011/0256886 A1 Oct. 20, 2011

Related U.S. Application Data

(63) Continuation-in-part of application No. 12/620,743, filed on Nov. 18, 2009.

(51) Int. Cl.
*G01S 5/00* (2006.01)
*G01S 19/03* (2010.01)
*G01S 19/14* (2010.01)
*G01S 19/24* (2010.01)
*H04N 7/18* (2006.01)

(52) U.S. Cl.
CPC ............ *G01S 5/0009* (2013.01); *G01S 19/03* (2013.01); *G01S 19/14* (2013.01); *G01S 19/24* (2013.01); *H04N 7/181* (2013.01); *H04N 7/185* (2013.01)

(58) Field of Classification Search
CPC ......... G01S 19/03; G01S 19/14; G01S 19/24; G01S 5/0009; H04N 7/81; H04N 7/185
USPC ...................................................... 348/158, 37
See application file for complete search history.

(56) References Cited

U.S. PATENT DOCUMENTS

| | | | |
|---|---|---|---|
| 5,694,514 A * | 12/1997 | Evans et al. ................... 386/240 |
| 2004/0017929 A1* | 1/2004 | Bramblet et al. ............. 382/103 |
| 2005/0253713 A1 | 11/2005 | Yokota | |
| 2006/0004579 A1* | 1/2006 | Claudatos et al. ............ 704/270 |
| 2006/0107296 A1* | 5/2006 | Mock et al. ................... 725/105 |
| 2006/0125930 A1* | 6/2006 | Mindrum et al. .......... 348/211.3 |
| 2007/0159323 A1* | 7/2007 | Rockefeller et al. ..... 340/539.17 |
| 2009/0041298 A1* | 2/2009 | Sandler et al. ................ 382/103 |

FOREIGN PATENT DOCUMENTS

| EP | 2146289 | * | 1/2010 | ............. G06F 17/30 |
| WO | WO2010006387 | * | 1/2010 | ............. G06F 17/30 |

\* cited by examiner

*Primary Examiner* — Anner Holder

(57) ABSTRACT

An approach is provided for automatic location-based imaging. User positional information is determined based on a mobile device associated with a user. The user positional information is correlated with camera positional information of a camera configured to capture one or more images of the user. The one or more images are retrieved from the camera based on the correlation.

20 Claims, 13 Drawing Sheets

1100

SYSTEM AND METHOD FOR PROVIDING AUTOMATIC LOCATION-BASED IMAGING USING MOBILE AND STATIONARY CAMERAS

RELATED APPLICATIONS

The present application is a Continuation-In-Part of U.S. patent application Ser. No. 12/620,743 filed Nov. 18, 2009, entitled "System and Method for Providing Automatic Location-Based Imaging"; the contents of which are hereby incorporated by reference.

BACKGROUND INFORMATION

Consumer adoption of mobile devices, such as cellular telephones, laptop computers, pagers, personal digital assistants, and the like, is increasing. These devices can be used for a diversity of purposes ranging from basic communications, to conducting business transactions, to managing entertainment media, and a host of other tasks. Additional enhancements, such as location-awareness features, e.g., global positioning system (GPS) tracking, also enable mobile device users to provide unique location-based services. One area of development has been the integration of these location-based services with imaging services (e.g., photography, videography, etc.) particularly when consumers visit commonly photographed locations (e.g., theme parks and other similar attractions). Such integrated services can free consumers to enjoy the location rather than focusing on capturing images of the location.

Therefore, there is a need for an approach that provides high quality automatic imaging of a user based on the user's location within a fixed geographical area (e.g., a theme park).

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for providing automatic location-based imaging are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although the various exemplary embodiments are described with respect to global positioning system (GPS) technology, it is contemplated that various exemplary embodiments are also applicable to other equivalent navigational and location determination technologies. Further, while various exemplary embodiments are described with respect to mobile devices, it is contemplated that various exemplary embodiments are equally applicable to providing automatic imaging based on spatial positioning (or location) of stationary devices, as well as animate and inanimate objects (or things). As used herein, the term "imaging" refers to capturing still images (e.g., photographs), moving images (e.g., videos, movies), and/or audio recordings using film-based cameras, digital cameras, cameras equipped with audio recording capabilities, audio recording devices, and the like. Accordingly, although various exemplary embodiments are described with respect to the images of the user, it is contemplated that various exemplary embodiments are also applicable to sounds captured of the user.

Figure 1A:
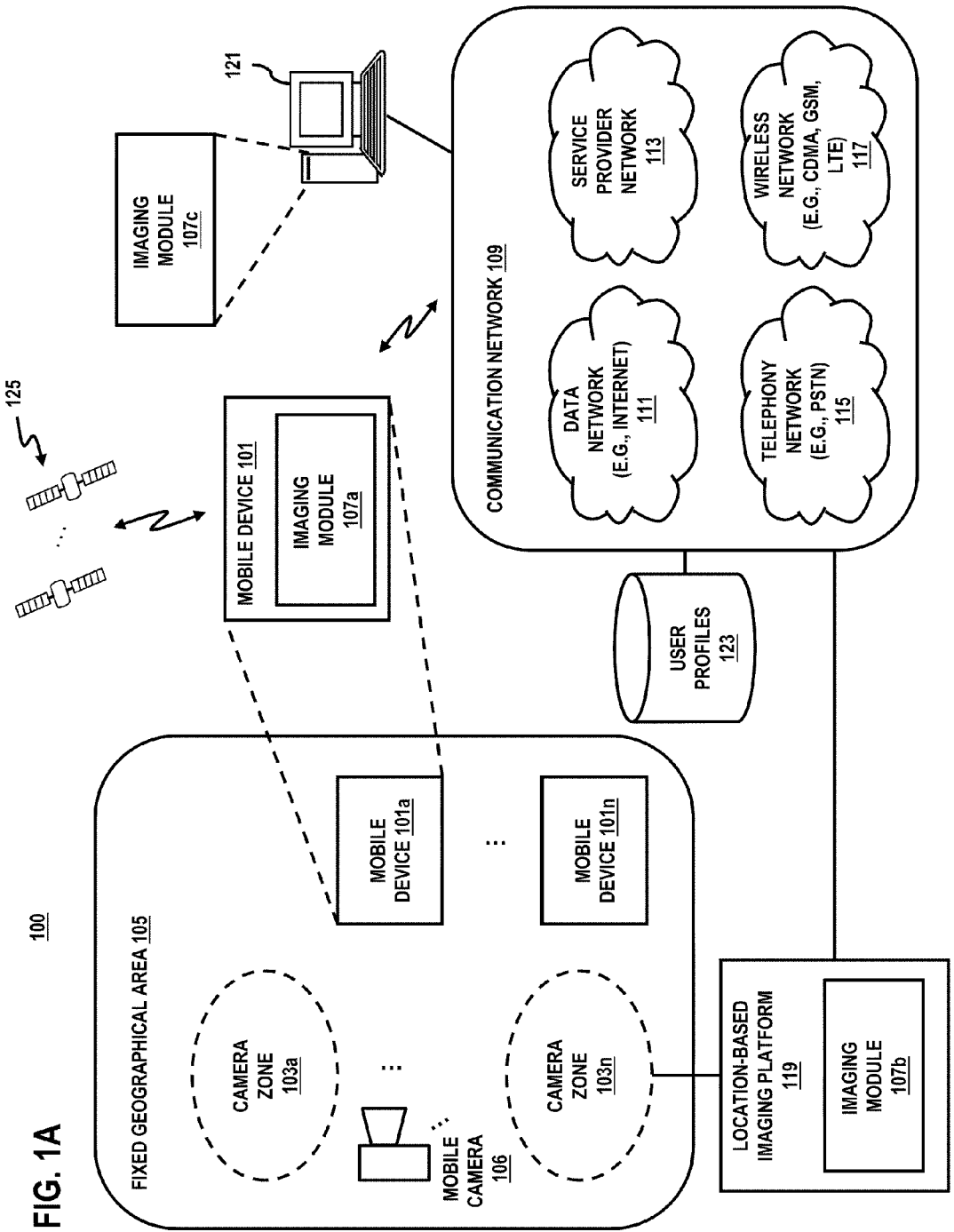
FIGS. 1A and 1B are, respectively, a diagram of system capable of providing automatic location-based imaging and a flowchart of the associated process, according to an exemplary embodiment.

FIG. 1A is a diagram of a system capable of providing automatic location-based imaging, according to an exemplary embodiment. As previously mentioned, consumers visiting locations including attractions (e.g., theme parks) typically carry cameras to take pictures or videos to preserve memories of their visit. However, capturing these images can become a chore for consumers and cause them to miss key moments of their visit. For example, a consumer may be spending more time on shooting photographs or videos than on enjoying the location with their family, friends, or other companions. Moreover, the consumer faces other obstacles to capturing images of the visit including the need to carry camera equipment, lack of photography skills, and lack of access to certain photography angles. The system 100 addresses these problems by pre-positioning cameras and/or other video or audio recording devices within a fixed geographical area (e.g., a theme park) and triggering the cameras or devices to capture images (e.g., photographs and/or videos) and/or sounds (e.g., audio recordings) of the consumer based on the consumer's location within the fixed geographical area. In addition or alternatively, the consumer's mobile device may cache the consumer's location and transmission to the system 100 at a later time (e.g., at the end of the user's visit). At the end of the user's visit or at the user's request, the system 100 can compile all images of the user captured during the user's visit based on the user's location information for delivery to the user.

As shown in FIG. 1A, the system 100 is described with respect to a mechanism for providing automatic imaging based on the location of one or more mobile devices (e.g. mobile device 101) in relation to one or more camera zones 103a-103n within a fixed geographical area 105. In one embodiment, the camera zone 103 comprises one or more pre-positioned or stationary cameras (e.g., still photography camera, video camera, other video or audio recording devices, etc.) and a corresponding area at which the camera or recording devices (hereinafter, referred to collectively as cameras) is pointed. Additionally, one or more mobile cameras 106 can be utilized to roam about the fixed geographical area 105 to augment the camera perspectives and provide improved camera coverage area (as the camera zones 103a-103n may not be able to completely address the entire fixed geographical area 105). Moreover, mobile cameras 106 may be deployed to camera zones that are experiencing heavy traffic; for instance, because of a certain event (e.g., a parade, concert, etc.). By way of example, the mobile camera 106 is configured with circuitry to provide location information—e.g., a global positioning system (GPS) receiver. Given the sophistication of mobile phones that are equipped with camera functionality, these devices can serve as the mobile camera 106.

In the scenario of FIG. 1A, a user who enters the camera zone 103 and comes within the target range of the pre-positioned camera(s) or the mobile camera 106 can automatically trigger the camera(s) if the user is subscribed to the automatic location-based imaging service. The camera zone 103 may be marked for easy identification by the user. The marking may include, for instance, visible markings (e.g., signs, demarcation lines, different color paint, and other similar markings), audible markings (e.g., audible announcement when user enters the zone 103, beeps, etc.), or other indicators (e.g., raised platform, ridge, road bumps, etc.).

In exemplary embodiments, the mechanism for providing automatic imaging may reside locally within respective mobile devices, such as imaging module 107a of mobile device 101, or alternatively (or additionally), may reside remotely over a communication network 109 (e.g., data network 111, service provider network 113, telephony network 115, and wireless network 117), such as imaging module 107b of location-based imaging platform 119 and imaging module 107c of a server 121. The location-based imaging platform 119 and/or server 121 can be maintained and operated by a service provider. In this manner, actions related to providing automatic location-based imaging services (e.g., initiating communication sessions, providing the location of mobile devices, or remotely configuring mobile devices) may be network-coordinated and/or coordinated by respective mobile devices 101a-101n. While specific reference will be made thereto, it is contemplated that system 100 may embody many forms and include multiple and/or alternative components and facilities.

In certain embodiments, automatic location-based imaging may be provided by utilizing the location-based imaging platform 119 in conjunction with the imaging modules 107a-107c. Mobile camera 106 can also execute an imaging module to operate in conjunction with the platform 119. The spatial positioning information of one or more mobile devices 101a-101n may be monitored in relation to the one or more camera zones 103a-103n and the mobile camera 106 within the fixed geographical area 105, such that if the mobile device 101 enters the fixed geographical area 105, the location-based imaging platform 119 begins tracking the location of the mobile device 101 to the determine whether the mobile device 101 is located within a camera zone 103. A process to provide automatic location-based imaging services is shown in FIG. 1B, according to one embodiment.

Figure 1B:
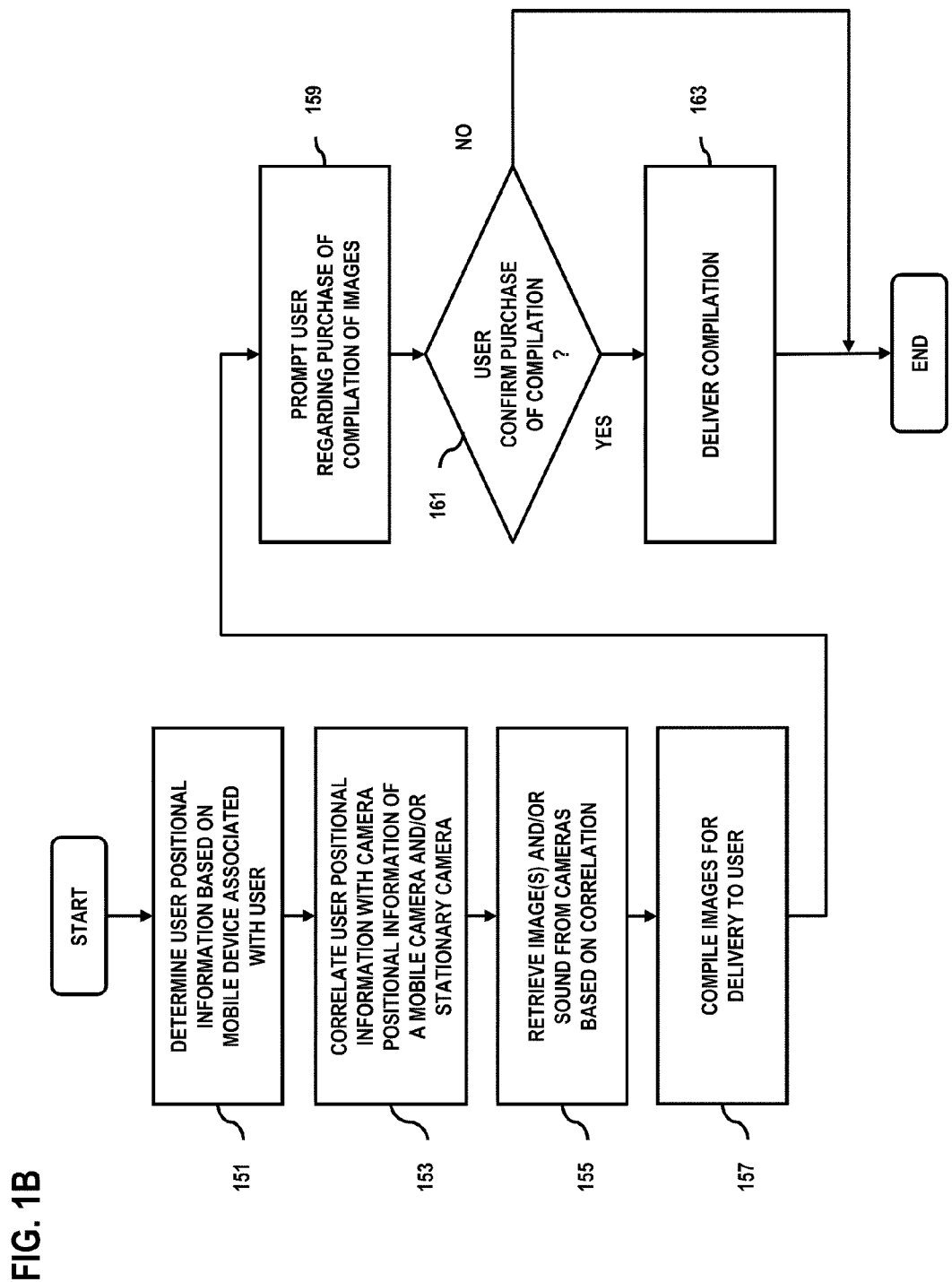

As seen in FIG. 1B, in step 151, user positional information is determined based on the mobile device (e.g., device 101a) associated with the user. At this point, images can be captured by the cameras that have the user within their fields of view. The mobile camera 106 and/or the camera pre-positioned within the camera zone 103 can be activated either manually or automatically to capture images of the user of the mobile devices 101. In an automatic mode of operation, the stationary cameras within the camera zones 103a-103n and mobile cameras (e.g., camera 106) operate continuously to capture images of users within the field of view of these cameras. In one embodiment, when the cameras are operated in an automatic or continuous mode of operation, the mobile device 101 need not continuously or periodic transmit its location information to the location-based imaging platform 119. Instead, the mobile device 101 may cache its location information and transmit the location information to the location-based imaging platform 119 at a later time. Once cached location-information is transmitted, the location-based imaging platform 101 may use the cached location information to identify the automatically captured images or other recordings (e.g., sounds) corresponding to the user. In this way, the mobile device 101 need not have a continuous connection to the location-based imaging platform 119 over the communication network 109.

By way of example, the location-based imaging platform 119 can identify subjects within the captured images by correlating user positional information received from the mobile devices 101. In step 153, platform 119 can correlate user positional information with the camera positional information of the mobile camera 106 and/or a stationary camera. In step 155, the images and/or sound recordings corresponding to the images can be retrieved from the appropriate cameras based on the correlation.

In a manual mode of operation, the cameras can be activated by the user when the user is in the camera zone 103 by, for instance, activating a button on the mobile 101 to signal the location-based imaging platform to trigger the camera. It is also contemplated that the user may trigger the camera by looking at the camera for a predetermined period of time. By way of example, the camera or the location-based imaging platform 119 may employ facial recognition technology to determine when the user is looking at the camera. The facial recognition technology may also be used to identify the user or other members of the user's party (e.g., friends, family members, etc.) in the captured images. In addition or alternatively, the location-based imaging platform 119 may employ audio recognition technology (e.g., voice signature analysis) to identify the user in images that have corresponding audio recordings. The platform 119 may store images or voice signatures of the user and members of the user's party on initiation of the imaging service for comparison during facial or audio recognition.

The location-based imaging platform 119 and/or imaging modules 107a-107c may operate one or more of the camera zones 103a-103n based on user profile information associated with the respective mobile devices 101. Such automatic location-based imaging enables users to capture images of their visits to the fixed geographical area 105 (e.g., a theme park) that the users may not otherwise be able to obtain.

Per FIG. 1B, the captured images can be compiled for potential delivery to the corresponding user of mobile device 101a, as in step 157. The approach described herein also enables users (or subscribers) to direct the compilation of the images according to user-selectable templates. These compilations can then be delivered to the user when the user leaves the fixed geographical area 105, at the request of the user, or according to any other defined procedure (e.g., at a predetermined time, after a set number of images, etc.).

In step 159, the user may be prompted via the mobile device 101a whether the user wishes to receive (e.g., purchase) the compilation of images (and/or sound)—e.g., video. In this example, platform 119 can issue a query to the mobile device 101a to determine whether the user seeks to purchase the compilation, per step 161. If the user confirms the purchase, for example, via a response initiated by mobile device 101a, then the media is delivered (step 163). The delivery may be made physically (e.g., pick from a central kiosk, mail delivery, etc.) or electronically (e.g., E-mail, posting to a website, etc.).

In addition, the location-based imaging platform 119 and/or imaging modules 107a-107c may enable access to information (e.g., positional information) and/or content (e.g., captured images) stored in the platform 119, modules 107a-107c, or the user profiles database 123 via one or more client programs or otherwise networked applications. That is, users may access the location-based imaging platform 119 or any of the imaging modules 107a-107c via a portal application, such as voice portal or a web portal. In exemplary embodiments, an application for providing the portal is deployed via location-based imaging platform 119; however, it is contemplated that another facility or component of system 100, such as a frontend, middleware, or backend server (e.g., the server 121) accessible over the communication network 109, can deploy the application and, consequently, interface with the location-based imaging platform 119. By way of example, the portal includes or provides access to one or more captured images or recordings, compilations of images, templates for making the compilations, and other information or content stored in location-based imaging platform, the imaging modules 107a-107c, as well as user profile information stored to user profiles database 123. In this manner, the portal enables users to input corresponding authentication information and, subsequently, define and manage information, content, or functions of the location-based imaging service. The portal also enables users to construct user profiles that, in exemplary embodiments, include user profile information (or policies) for automatically capturing location-based images and for making compilations of the those images. Further, the portal may be utilized by authorized individuals to ascertain the location of a mobile device, such as mobile device 101. In this manner, location-based imaging platform 119 may also be accessible to suitable computing devices (not shown) or suitable voice stations (not shown) with connectivity to the communication network 109.

Accordingly, communication network 109 enables mobile devices 101 and other similar client devices (not shown) to access location-based imaging services (or functionality) through the location-based imaging platform 119 and/or the imaging modules 107a-107c. As previously mentioned, the communication network 109 includes one or more wireline and/or wireless network such as a data network 111, service provider network 113, telephony network 115, and wireless network 117. Networks 111, 113, 115, and 117 may be any suitable wireline and/or wireless network. For example, data network 111 may be any local area network (LAN), metropolitan area network (MAN), wide area network (WAN), the Internet, or any other suitable packet-switched network, such as a commercially owned, proprietary packet-switched network having voice over internet protocol (VoIP) capabilities, e.g., a proprietary cable or fiber-optic network. Telephony network 115 may include a circuit-switched network, such as the public switched telephone network (PSTN), an integrated services digital network (ISDN), a private branch exchange (PBX), or other like network. Meanwhile, wireless network 117 may employ various technologies including, for example, code division multiple access (CDMA), enhanced data rates for global evolution (EDGE), general packet radio service (GPRS), global system for mobile communications (GSM), long term evolution (LTE), Internet protocol multimedia subsystem (IMS), universal mobile telecommunications system (UMTS), etc., as well as any other suitable wireless medium, e.g., microwave access (WiMAX), wireless fidelity (WiFi), satellite, and the like.

Although depicted as separate entities, networks 111-117 may be completely or partially contained within one another, or may embody one or more of the aforementioned infrastructures. For instance, the communication network 109 and/or the service provider network 113 may embody circuit-switched and/or packet-switched networks that include facilities to provide for transport of circuit-switched and/or packet-based communications. It is further contemplated that networks 111-117 may include components and facilities to provide for signaling and/or bearer communications between the various components or facilities of system 100. In this manner, networks 111-117 may embody or include portions of a signaling system 7 (SS7) network, or other suitable infrastructure to support control and signaling functions.

Accordingly, automatic location-based imaging and/or user access of the location-based imaging platform 119 may be initiated or performed over one or more of networks 111-117 of the communication network 109. As such, mobile devices 101a-101n are client devices including any customer premise equipment (CPE) capable of sending and/or receiving information over one or more of networks 111-117. For instance, in one embodiment, a mobile device 101 (e.g., a voice station) may be any suitable plain old telephone service (POTS) device, facsimile machine, etc. In another embodiment, the mobile device 101 may be any cellular phone, radiophone, satellite phone, smart phone, wireless phone, or any other suitable mobile device, such as a personal digital assistant (PDA), pocket personal computer, tablet, customized hardware, etc. Further, the mobile device 101 may be any suitable computing device, such as a VoIP phone, skinny client control protocol (SCCP) phone, session initiation protocol (SIP) phone, IP phone, personal computer, softphone, workstation, terminal, server, etc.

Client devices such as the mobile device 101 can include one or more client programs (e.g., imaging module 107a-107c) that operate thereon for providing access to the automatic location-based imaging services of system 100. According to one embodiment, these client programs may relate to one or more GUIs configured to interface with the various services (or functions) of system 100, such as creating, customizing, and managing user profiles or managing the location-based imaging services. Additionally, the GUIs may be configured to facilitate the acquisitioning, exchanging, managing, sharing, storing, and updating of automatically captured location-based images or user profiles between and among the subscribers to the service of system 100. The GUI applications may interface with the aforementioned web portal or otherwise networked application.

The user profiles database 123 may include information corresponding to the users (or subscribers) of the automatic location-based imaging service of system 100, such as user profile information including information, preferences, or policies for automatically capturing, transferring, or compiling images of the user with the fixed geographical area 105. By way of example, user profile information includes subscription information (e.g., account numbers, usernames, passwords, security questions, monikers, etc.), subscriber demographics (e.g., age, gender, ethnicity, location of residence, zip code, school district, community, socioeconomic status, religion, marital status, ownerships, languages, mobility, life cycles, etc.), group/organizational affiliations (e.g., political), memberships, interests, system configurations, policies, associated users/devices, etc. In other instances, user profile information also includes historical and/or real-time spatial positioning information relating to the spatial position or location of mobile devices 101 associated with the user profile.

Accordingly, it is contemplated that the physical implementation of the user profiles database 123 and other information databases (not shown) of system 100 may take on many forms, including, for example, portions of existing databases of a service provider, new databases of a service provider, third-party databases, and/or shared databases. As such, the database 123 may be configured for communication over system 100 through any suitable messaging protocol, such as lightweight directory access protocol (LDAP), extensible markup language (XML), open database connectivity (ODBC), structured query language (SQL), and the like, as well as combinations thereof. In those instances when databases of system 100 (e.g., the database 123) are provided in distributed fashion, information and content available via the database may be located utilizing any suitable querying technique, such as electronic number matching, distributed universal number discovery (DUNDi), uniform resource identifiers (URI), etc.

Although the automatic location-based imaging service is described with respect to the mobile device 101, it is recognized that the imaging functions can be applied to any device capable of transmitting its location to the location-based imaging platform 119 or performing the processes described herein. Such devices may, in certain embodiments, include the server 121 or other similar device. In other embodiments, a location module (such as location module 401 of FIG. 4) may be attached (or otherwise associated with) an animate or inanimate object (or thing), such that one or more location-based imaging function (e.g., image capture) may be initiated or performed based on the spatial positioning (or location) of the animate (e.g., a user) or inanimate object (e.g., a thing). According to other exemplary embodiments, the mobile device 101 may be attached to (or otherwise associated with) an animate or inanimate object, such that automatic location-based imaging service be initiated or performed based on the spatial positioning (or location) of the animate or inanimate thing with the fixed geographical area 105.

Figure 2:
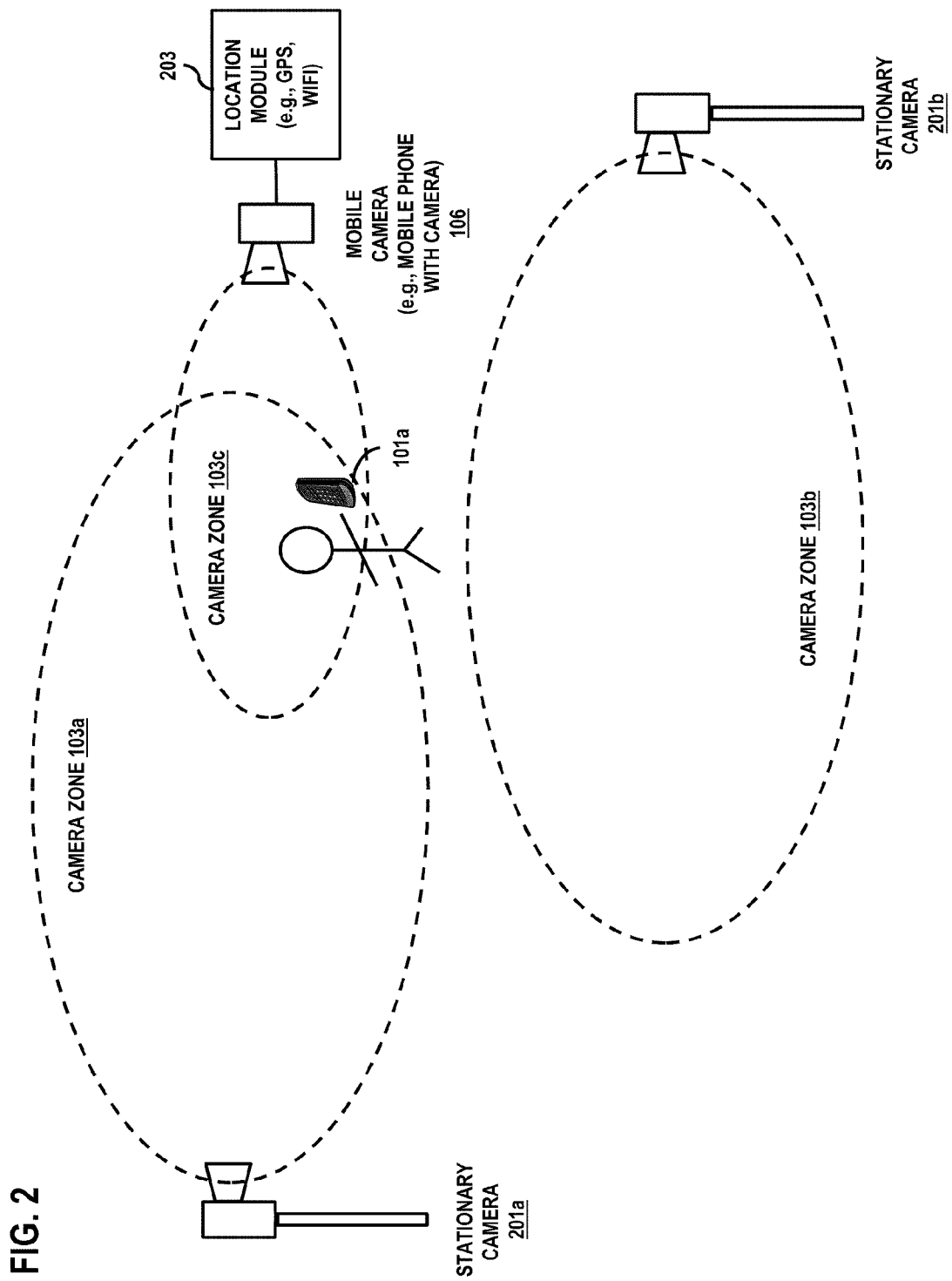
FIG. 2 is a diagram of a camera arrangement employing stationary and mobile cameras utilized in the system of FIG. 1A, according to an exemplary embodiment.

FIG. 2 is a diagram of a camera arrangement employing stationary and mobile cameras utilized in the system of FIG. 1A, according to an exemplary embodiment. Continuing with the example of FIG. 1A, stationary cameras 201a and 201b are situated within camera zones 103a and 103b, respectively. It is contemplated that multiple stationary cameras may be deployed within each of the camera zones 103a and 103b; the particular quantity depends on the application. For instance, if the geographic area 105 is that of a theme park, then more cameras can be implemented for locations with more popular attractions. Furthermore, multiple mobile cameras (of which one camera 106 is shown) can be utilized; each of the mobile cameras can include a location module 203 that is configured to determine positional information of the camera 106. In one embodiment, location module 203 employs GPS signals and/or WiFi signals to aid in this determination.

In effect, mobile camera 106 provides a roaming camera zone 103c. As such, coverage of the geographical area 105 can be more thorough. Also, as mentioned, the mobile camera 106 can be dispatched to an area with greater density of people. In the theme park example, if an event draws a large crowd, then more mobile cameras 106 can be dispatched to cover the area for the duration of the event. Thereafter, the mobile cameras 106 can resume their normal pattern or routine. In certain embodiments, the mobile cameras 106 can be affixed to a hostess or other personnel (e.g., mascot), whose duties include mingling and greeting the patrons.

As noted, use of the mobile cameras 106 can also provide a different camera perspective, thereby providing greater artistic capability when the video is compiled and edited.

Figure 3:
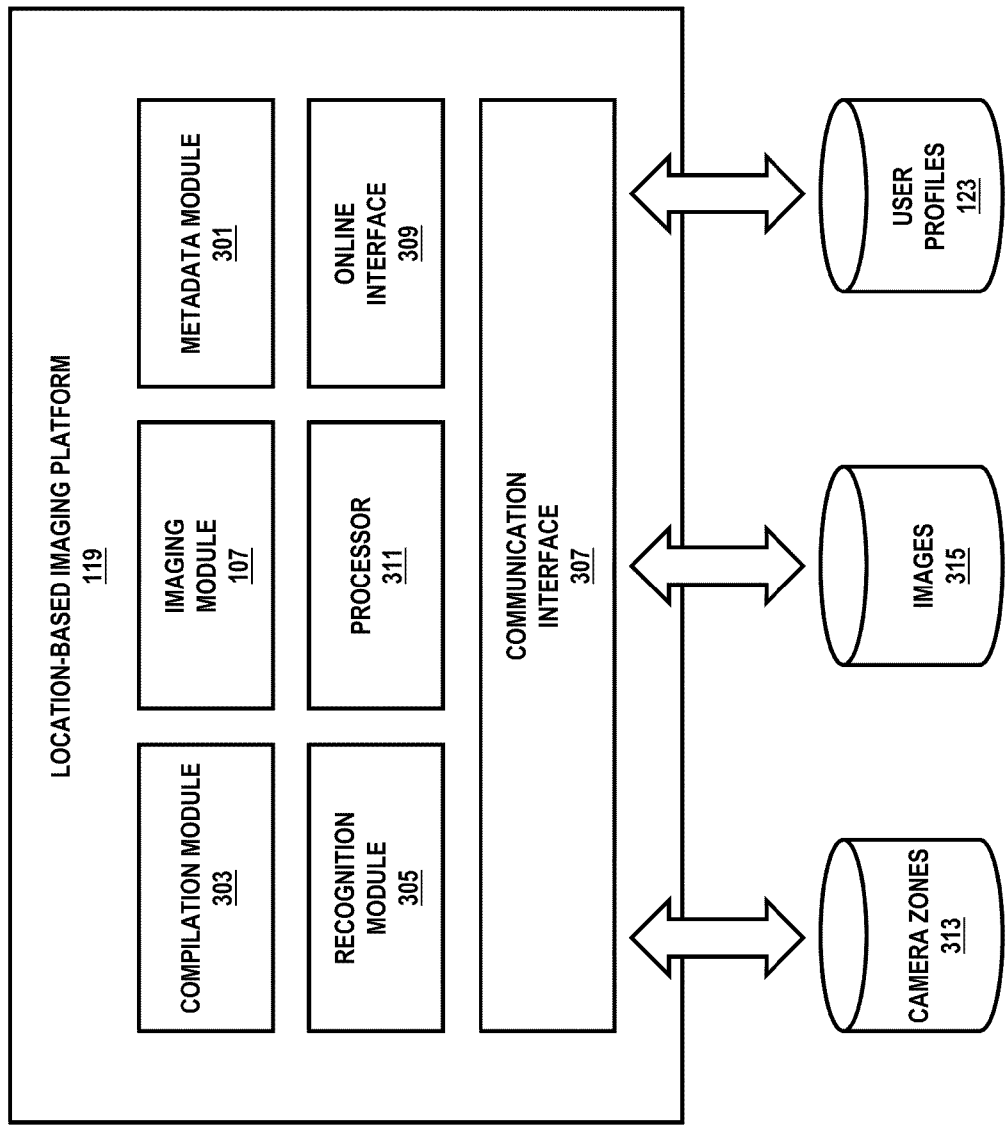
FIG. 3 is a diagram of a location-based imaging platform, according to an exemplary embodiment.

FIG. 3 is a diagram of a location-based imaging platform, according to an exemplary embodiment. Location-based imaging platform 119 may comprise computing hardware (such as described with respect to FIGS. 10 and 11), as well as include one or more components configured to execute the processes described herein for providing the automatic location-based imaging service. In one implementation, platform 119 includes an imaging module 107, metadata module 301, compilation module 303, recognition module 305, communication interface 307, online interface 309, and processor (or controller) 311. Platform 119 may also communicate with one or more databases, such as a camera zones database 313, images database 315, and user profiles database 123. Users may access platform 119 (or the features and functionality provided thereby) via the mobile device 101 or similar client devices. While specific reference will be made to this particular implementation, it is also contemplated that platform 119 may embody many forms and include multiple and/or alternative components. For example, it is contemplated that the components of platform 119 may be combined, located in separate structures, or separate locations.

According to one embodiment, platform 119 embodies one or more application servers accessible to the mobile device 101 over the communication network 109. Users (or subscribers) can access platform 119 to create, customize, and manage the automatic location-based imaging service, as well as generate and modify one or more user profiles that, in exemplary embodiments, include user profile information for initiating or performing one or more functions of the platform 119 or imaging module 107. It is contemplated that the images of the user may be automatically captured by cameras in the camera zones 103 based on real-time or cached positional information corresponding to the location of mobile devices 101 and, in certain instances, correlation with user profile information. As such, platform 119 provides a user interface, e.g., web portal or otherwise networked application, to permit user access to the features and functionality of platform 119 via the mobile device 101. According to certain embodiments, online interface module 309 may be configured for exchanging information between the mobile device 101 and a web browser or other network-based application or system, such as a voice browser or interactive voice recognition system.

In exemplary embodiments, online interface module 309 executes a graphical user interface (GUI) configured to provide users with one or more menus of options for creating, customizing, and managing user profiles, as well as engaging with the features of the location-based imaging service (or functionality) of system 100, such as triggering the capture of one or more images (e.g., photographs and/or videos) corresponding to the location of respective mobile devices 101, transferring one or more of the captured images to mobile devices 101 associated with respective users, compiling images captured over a period of time according to user-selectable templates, delivering the compilation of images to the users of respective mobile devices 101, etc.

According to exemplary embodiments, the location-based imaging platform 119 is also configured to receive real-time or cached positional information corresponding to the respective locations of one or more mobile devices (e.g., mobile device 101). Real-time positional information may be obtained from mobile devices 101 and, thereby, tracked via imaging module 107. Additionally (or alternatively), the imaging module 107 may "poll" mobile devices 101 for real-time positional information. In another embodiment, the imaging module 107 may receive all or a portion of the positional information as cached information from the mobile devices (e.g., information that is stored in the mobile devices 101 and then subsequently transmitted to the imaging module 107). Based on the positional information of a mobile device 101 and user profile associated with the mobile device 101, the imaging module 107 determines whether the location of the mobile device 101 is within a camera zone 103 and can activate the pre-positioned camera within the camera zone 103 to capture an image of the user. If the positional information has been cached or transmitted in non-real time, the imaging module may correlate the received cached positional information against previously captured images corresponding to the positional information. In one embodiment, the imaging module 107 initiates reception of positional information from the mobile device 101 when it's positional information indicates that the mobile device 101 has entered into the fixed geographical area 105 and stops reception of the positional information when the mobile device 101 exits the fixed geographical area 105. When operating in a cached mode, the imaging module 107 may receive the cached positional information when the mobile exits the fixed geographical area 105.

Information related to the location and configuration of each camera zone 103 (e.g., camera coverage area, camera configuration, visible landmarks or attractions, angle of images, etc.) is stored and retrieved from, for instance, the camera zones database 313 via the communication interface 307. Similarly, the imaging module 107 stores and retrieves captured images in the images database 315 via the communication interface 307. In some embodiments, the imaging module 107 can immediately or at the request of the user transmit the capture images to the mobile device 101 associated with the user. In other embodiments, the imaging module 107 can interact with the recognition module 305 to determine when the user associated with the mobile device 101 is, for instance, looking at the camera for predetermined period of time to initiate activation of the camera or speaking within proximity of the camera. For example, a user is informed that he or she is in a camera zone 103 and the location of the associated pre-positioned camera can be identified (e.g., via a sign, marker, or the like). Accordingly, to have an image captured within the camera zone 103, the user can look at the pre-positioned camera to trigger the camera, speak (e.g., predetermined phrases such as "take picture"), or make other recognizable sounds. If the camera is video-capable, the camera may capture video segments of the user when the user's face is visible within the camera frame or when the user's voice is recognized within proximity of the camera. In yet another embodiment, the recognition module 305 can identify the most exciting captured images by, for instance, identifying the facial expressions of the subjects in the photographs or identifying laughter or other sounds of excitement (e.g., screaming, clapping, etc.). For example, the recognition module 305 can identify when subjects are laughing or have facial expressions indicating smiles, laughter, or excitement and then quantify the number of subjects with such expressions. Images containing subjects with a higher number or percentage of such sounds or expressions can be categorized as more exciting.

After capturing one or more images of the user, the imaging module 107 can direct the metadata module 301 to, for instance, add descriptive metadata to the image file. By way of example, the metadata may describe the date, time, location, weather, nearest attraction, recognized faces, etc. It is contemplated that the user, the service provider, or other operator of the automatic location-based imaging service can determine the specific metadata to associate with captured images. By way of example, the imaging module 107 or the user can search, organize, or otherwise manipulate the captured images using queries of the metadata associated with the captured images.

Once the imaging module 107 has completed an image capturing session, the module 107 can interact with the compilation module 303 to compile in the captured images for presentation and/or delivery to the user. By way of example, the end of an image capturing session can be signaled by the following: (1) when the received positional information indicates that user has exited the fixed geographical area; (2) after a fixed period of time as determined by the user (e.g., in the user profiles database 123), the service provider, or other operator of the service; (3) when the user manually directs the imaging module 107 to end the session via, for instance, the mobile device 101; (4) after a predetermined number (or duration, in the case of video) of images has been captured; or (5) any combination thereof. In one embodiment, the user selects one or more predefined templates for the compilation module 303 to use in compiling the images. For example, the predefined templates specify the style of scene transitions, specific camera angles, overlay type style, narrative style, pacing, musical accompaniment, sound effects, etc. In one embodiment, the predefined templates may be created by notable individuals or celebrities (e.g., famous directors, actors, artists, public figures, etc.). In addition, the compilation may select the specific images to include in the compilation according to the template, the metadata associated with the captured images, and/or user selection. According to certain embodiments, the compilation module 303 may initiate the delivery of the compilation on a physical format (e.g., DVD, flash memory, etc.) or via electronic mechanisms (e.g., E-mail, posting to a website for download by the user, transmitting to the user's mobile device 101, etc.).

It is also contemplated that the aforementioned web portal (or networked application) provided by (or accessed through) online interface module 309, can be utilized to initiate or perform one or more functions of the location-based imaging platform 119. Online access via the module 309 can be useful when the user would like to preview images, select images, initiate compilation of images, etc., from a device other than the mobile device 101. For example, the user may access the functions of the location-based imaging platform 119 using a personal computer to provide a larger screen to view captured images.

Accordingly, to provide selective access to the features and functionality of the automatic location-based imaging service (or functionality) of system 100, the location-based imaging platform 119 may also include an authentication module (not illustrated) for authenticating (or authorizing) users to the services. It is contemplated that the authentication module may operate in concert with communication interface 307 and/or online interface module 309. That is, the authentication module may verify user provided credential information acquired via communication interface 307 or online interface module 309 against corresponding credential information stored within a user profile of user profiles database 123. By way of example, the credential information may include "log on" information corresponding to a user name, password, coded key, or other unique identification parameter, such a personal identification number (PIN). In other embodiments, the credential information may include any one, or combination of, a birth date, an account number (e.g., bank, credit card, billing code, etc.), a social security number (SSN), an address (e.g., work, home, IP, media access control (MAC), etc.), or telephone listing (e.g., work, home, cellular, etc.), as well as any other form of uniquely identifiable datum, e.g., biometric code, voice print, etc. Users may provide this information via the mobile device 101 or similar client device, such as by spoken utterances, dual-tone multi-frequency signals (DTMF), packetized transmission, or other suitable method. Unobtrusive security may be provided by positively identifying and screening users based on one or more of the aforementioned credentials that may be seamlessly provided when the mobile device 101 communicates with the platform 119, such as a unique IP or MAC address. Other unobtrusive measures can be made available via user specific voice prints, etc.

Additionally, the platform 119 may include one or more processors (or controllers) 311 for effectuating the location-based imaging service, as well as one or more memories (not shown) for permanent or temporary storage of one or more of the previously described control commands, parameters, camera zones 103, captured images, user selections, user profile information, variables, etc.

Figure 4:
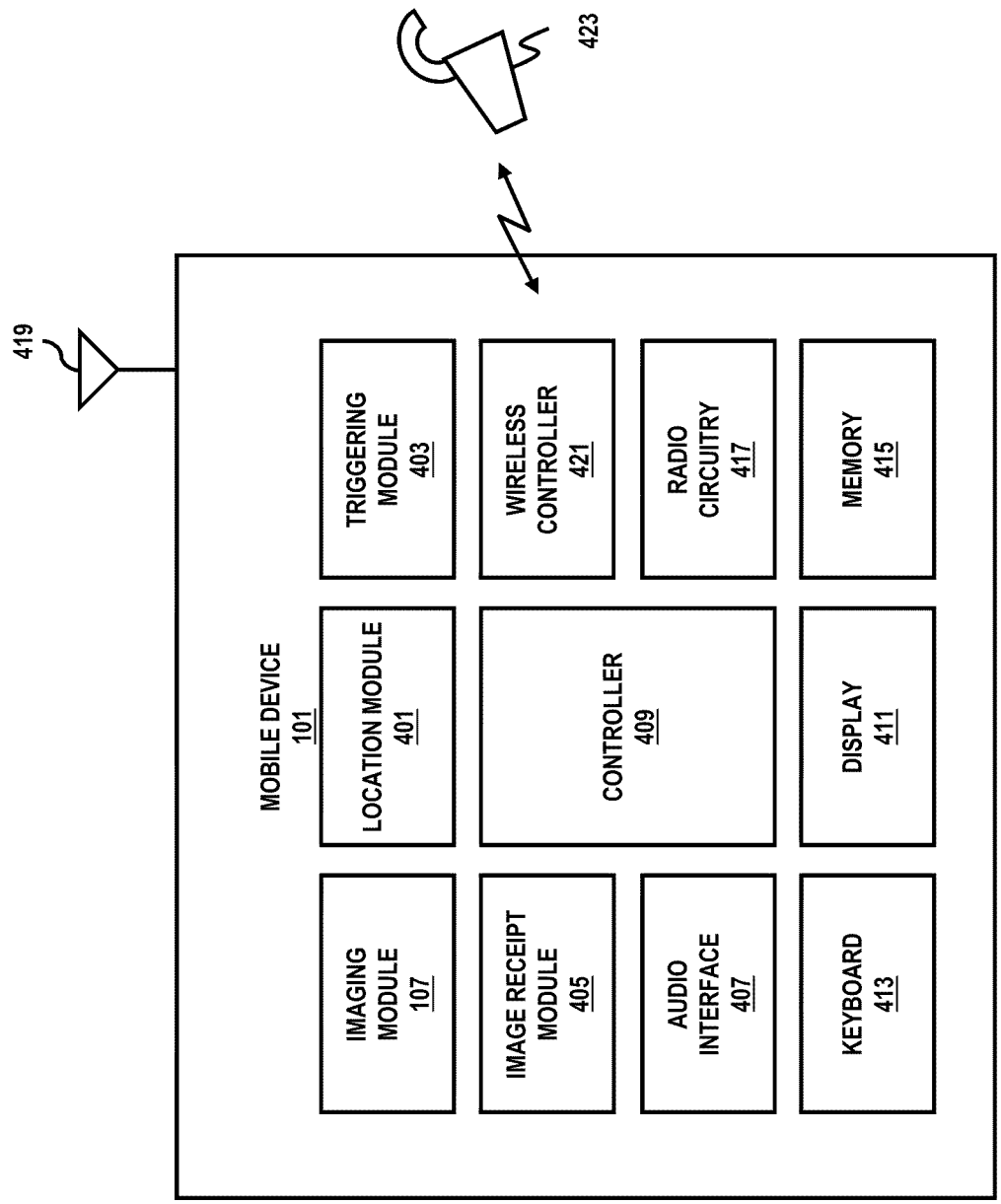
FIG. 4 is a diagram of a mobile device configured for providing automatic location-based imaging, according to an exemplary embodiment.

FIG. 4 is a diagram of a mobile device configured for providing automatic location-based imaging, according to an exemplary embodiment. A mobile device 101 may comprise computing hardware (such as described with respect to FIGS. 10 and 11), as well as include one or more components configured to execute the processes described herein for providing automatic location-based imaging. In this example, the mobile device 101 includes imaging module 107, location module 401, triggering module 403, image receipt module 405, audio interface 407, controller (or processor) 409, display 411, keyboard 413, memory 415, radio circuitry 417 coupled to antenna 419, and wireless controller 421. While specific reference will be made thereto, it is also contemplated that mobile device 101 may embody many forms and include multiple and/or alternative components.

According to various embodiments, mobile device 101 is configured to transmit real-time or cached positional information corresponding to its location to the location-based imaging platform 119. In return, the location-based imaging platform 119 correlates the location to one or more predefined camera zones 103 within the fixed geographical area 105 to initiate automatic location-based images. The activation of the one or more pre-positioned cameras within the camera zone 103 or the mobile camera 106 and the subsequent capturing of one or more images can be based further on user profile information associated with the mobile device 101. It is contemplated, however, that mobile device 101 may, in certain other embodiments, assume one or more of the aforementioned responsibilities of the location-based imaging platform 119 or function in concert with the location-based imaging platform 119. As such, mobile device 101 includes one or more client programs (or instructions) (e.g., the imaging module 107) that operate thereon to access and/or execute these functions; however, it is contemplated that these client programs may be executed by platform 119 (or another facility of system 100) and, thereby, accessible to users via the mobile device 101.

The client programs may relate to one or more GUIs configured to control the functions of the automatic location-based imaging service, as well as the generation and modification of one or more user profiles that, in exemplary embodiments, include user profile information for initiating or performing one or more functions of the location-based imaging service. Network browser applications may be provided for accessing similar applications made available by, for example, the location-based imaging platform 119. Users may interface with these client programs via audio interface 407, display 411, keyboard 413, and/or any other suitable input mechanism, e.g., buttons, joysticks, soft controls, touch panels, widget applications, etc. Audio interface 407 may include one or more components and corresponding functionality for effectuating a voice interface, e.g., speech synthesis technology and voice recognition capabilities.

Accordingly, the one or more client programs may be stored to memory 415, which may include volatile and/or non-volatile memory, such as erasable programmable read-only memory (EPROM), electrically erasable programmable read-only memory (EEPROM), flash memory, random access memory (RAM), read only memory (ROM), etc. Memory 415 may be implemented as one or more discrete devices, stacked devices, or integrated with controller 409. In addition, communication signals, such as voice calls, short messages, multimedia messages, and control signals, received by mobile device 101 may also be stored to memory 415.

Real-time or cached positional information may be obtained or determined via location module 401 using, for example, GPS technology. In this way, location module 401 can behave as a GPS receiver. Thus, mobile device 101 employs location module 401 to communicate with a constellation 125 of satellites. These satellites 125 transmit very low power interference and jamming resistant signals that can be received by location module 401. At any point on Earth, location module 401 can receive signals from multiple GPS satellites. Specifically, location module 401 may determine three-dimensional geolocation (or spatial positional information) from signals obtained from at least four satellites. Measurements from satellite tracking and monitoring stations located around the world are incorporated into orbital models for each satellite to compute precise orbital or clock data. GPS signals are transmitted over two spread spectrum microwave carrier signals that are shared by GPS satellites 125. Therefore, if mobile device 101 can identify the signals from at least four satellites 125, location module 401 may decode the ephemeris and clock data, determine the pseudo range for each satellite 125 and, thereby, compute the spatial position of a GPS receiving antenna (not shown). With GPS technology, mobile device 101 can determine its spatial position with great accuracy and convenience.

Additionally, mobile device 101 may employ A-GPS (assisted-GPS) to mitigate the loss of GPS signals from obstructions between the location module 401 and satellites 125. When operating in A-GPS mode, mobile device 101 can provide for better in building or obstructed view spatial positional information. Assistance data can be transmitted to mobile device 101 from, for example, wireless network 117. In an exemplary embodiment, A-GPS information may include ephemeris data, differential GPS correction data, timing data, and other aiding data. Using the aiding (or assistance) data, location module 401 performs spatial positioning calculations via, for example, controller (or processor) 409.

In an exemplary embodiment, mobile device 101 can generate real-time or cached speed and route adherence alerts using this calculated information. Additionally, transmission of the spatial positional information need not be frequent; in fact, positional information may be cached and then transmitted at a later time. Further, transmission of the geolocation data can be made more compact because it is true location rather than pseudo range data. Also, mobile device 101 can more intelligently request assistance data because the device can itself determine when ephemeris data is no longer valid. It is also contemplated that other suitable navigation and location determination technologies may be utilized, such as advanced forward link trilateration (A-FLT), enhanced cellular identification (CELL-ID), wireless local area network (WLAN) positioning, etc. In any case, determined spatial positional information may be transmitted to the location-based imaging platform 119 via radio circuitry 417 and/or wireless controller 421. It is generally noted that wireless controller 421 may also be utilized to communicate with a wireless headset 423. Headset 423 can employ any number of standard radio technologies to communicate with wireless controller 421; for example, headset 423 can be BLUETOOTH™ enabled. It is contemplated that other equivalent short range radio technology and protocols can be utilized.

Received information, such as spatial positioning information, captured images, incoming communication sessions, one or more pages of GUI content, etc., may be presented to users via display 411. Mobile device 101 is also configured to store and execute instructions for supporting the location-based imaging services of system 100 via the imaging module 107, as well as other communication functions made available via radio circuitry 417. In this manner, controller 409 controls the operation of mobile device 101 according to programs and/or data stored to memory 415. Control functions may be implemented in a single controller (or processor) or via multiple controllers (or processors). Suitable controllers may include, for example, both general purpose and special purpose controllers, as well as digital signal processors, local oscillators, microprocessors, and the like. Controller 409 may also be implemented as a field programmable gate array controller, reduced instruction set computer processor, etc. Controller 409 may interface with audio interface 407 that provides analog output signals to one or more speakers (not shown) and receives analog audio inputs from one or more microphones (not illustrated).

According to some embodiments, mobile device 101 includes imaging module 107, location module 401, triggering module 403, and image receipt module 405 for assuming one or more of the aforementioned functions described with respect to the location-based imaging platform 119. By way of example, the triggering module 403 may be used by the mobile device 101 to trigger the activation of a pre-positioned camera with a camera zone 103 rather than having the platform 119 trigger the activation. The triggering module 403, for instance, enables the user of the mobile device 101 to trigger activation of the camera by actuating a button or other command on the mobile device 101 to signal the platform 119 to activate the pre-positioned camera in the camera zone 103 in which the mobile device 101 is located. The platform 119 can then transmit the captured images to the image receipt module 405 of the mobile device 101 via the radio circuitry 417.

Figure 5:
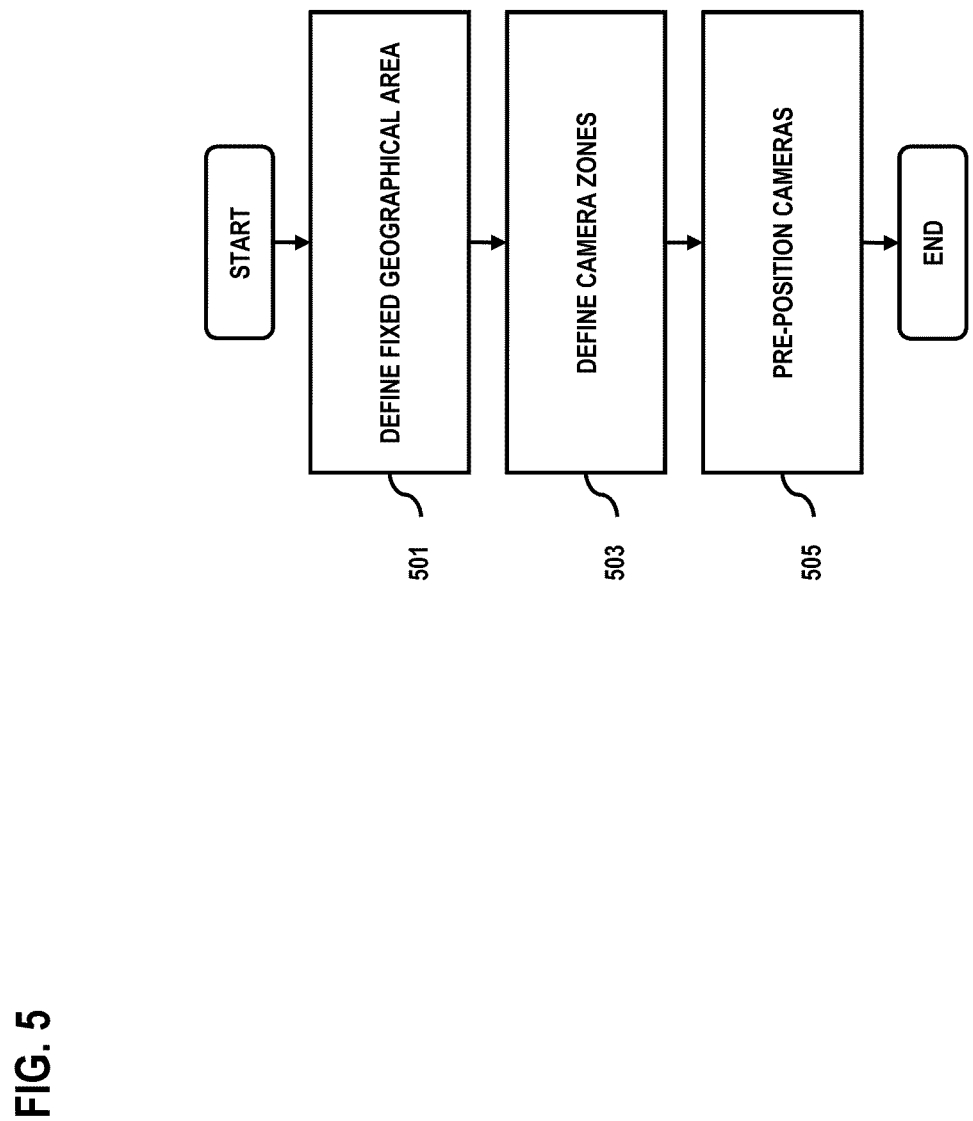
FIG. 5 is a flowchart of a process for preparing a fixed geographical area to implement automatic location-based imaging, according to an exemplary embodiment.

FIG. 5 is a flowchart of a process for preparing a fixed geographical area to implement automatic location-based imaging, according to an exemplary embodiment. The process of FIG. 5 is an example of a process that a provider of a location-based imaging service employs to initiate automatic location-based imaging within a fixed geographical area 105. In step 501, the service provider defines the extent of the fixed geographical area 105 for providing the location-based imaging service. For example, the fixed geographical area 105 may correspond to the area of a current location or attraction (e.g., a theme park, tourist attraction, museum, public arena, nature park, etc.). More specifically, the geographical boundaries may be delineated by specifying the geographical coordinates (e.g., longitude/latitude) corresponding to location points along the boundary. Geographical coordinates falling within this boundary may be then considered to be within the fixed geographical area 105.

The service provider then defines one or more camera zones 103 within the fixed geographical area 105 (step 503) as well as deployment of the mobile camera 106. The camera zones 103 may be defined to capture images and/or other recordings at various locations within the fixed geographical area 105. By way of example, if the fixed geographical area 105 is a theme park, the service provider may define the camera zones 103 to cover rides and other attractions. It is contemplated that the service provider may define any number of camera zones 103 including enough camera zones 103 to cover the entire area of the fixed geographical area 105. Moreover, it is contemplated that the service provider may define overlapping camera zones 103 to, for instance, enable capture of images from various angles or provide redundant camera capabilities. After defining the camera zones 103, the service provider pre-positions one or more cameras in each camera zone 103 to enable capture of images (step 505). These cameras are, for instance, high resolution still and/or video cameras. The cameras may include audio recording capabilities or may be paired with separate audio recording devices. In certain embodiments, the service provider can mark (e.g., visible or audible marking) the camera zones 103 and the corresponding location of the one or more cameras within the camera zone 103. In this way, users can easily identify at which locations the location-based imaging service is active. In addition or alternatively, the location-based imaging platform 119 and/or the mobile device can alert the user on the mobile device 101 when the user enters a camera zone 103.

Figure 6:
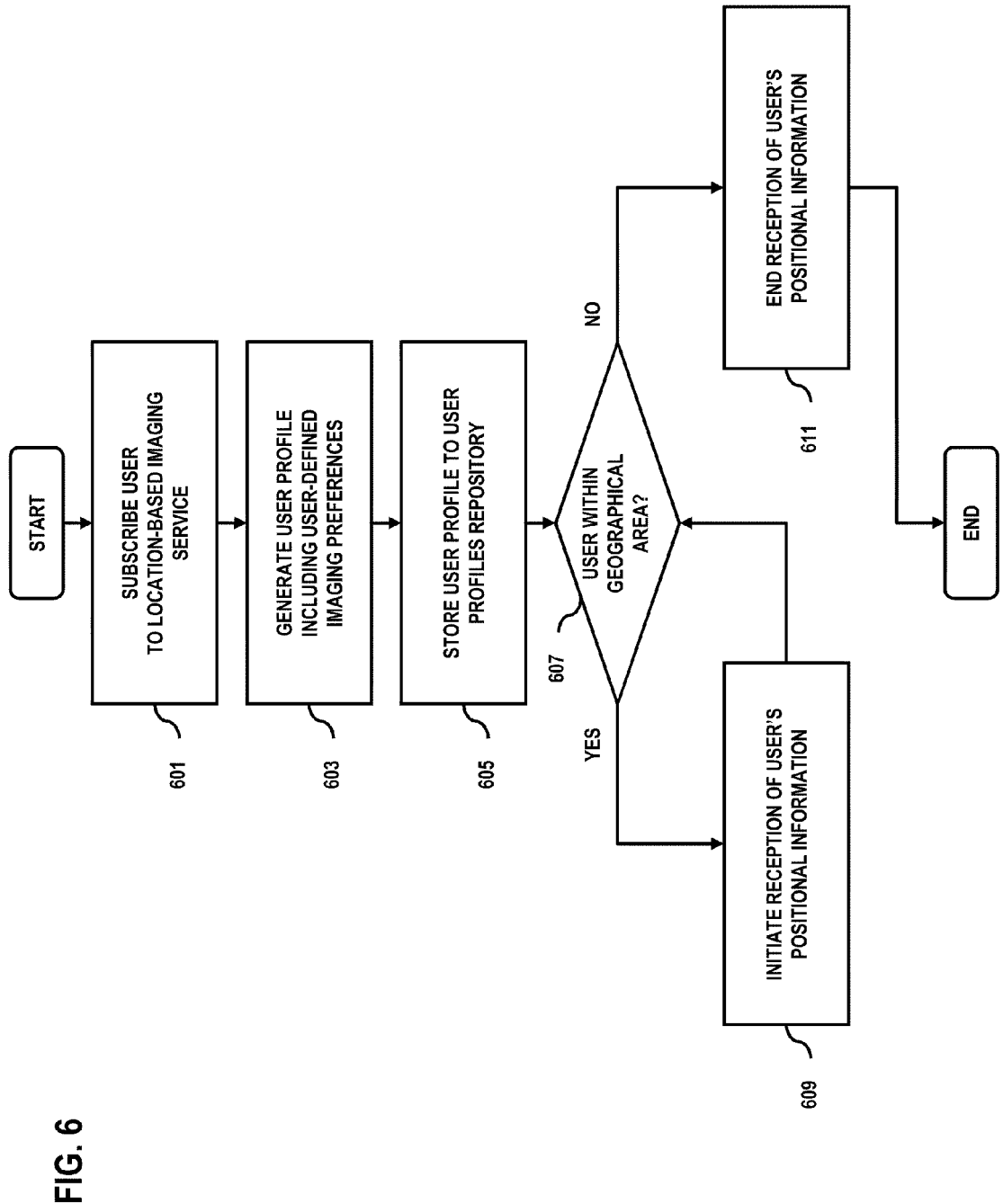
FIG. 6 is a flowchart of a process for subscribing to and initiating an automatic location-based imaging service, according to an exemplary embodiment.

FIG. 6 is a flowchart of a process for subscribing to and initiating an automatic location-based imaging service, according to an exemplary embodiment. For illustrative purposes, the process of FIG. 6 is described with respect to a network-coordinated service and, thereby, with reference to FIG. 1A. It is noted that the steps of the process may be performed in any suitable order, as well as combined or separated in any suitable manner. At step 601, the location-based imaging platform 119 subscribes a user to the automatic location-based imaging service of system 100. According to one embodiment, the user may subscribe utilizing a client device capable of processing and transmitting information over the communication network 109 such as the mobile device 101 or similar client device. Namely, the user may interact with an input interface of, for example, mobile device 101 to activate software resident on the device, such as a GUI or other networked application that interfaces with (or is implemented by) the location-based imaging platform 119. As such, the user can register as a new subscriber of the location-based imaging service, as well as obtain sufficient authentication information for establishing future sessions with the platform 119. In certain embodiments, registration procedures may prompt the user to identify all mobile devices, such as mobile device 101, that the user may employ to interact with the location-based imaging service of system 100. In this manner, registered devices may be logically associated with the user and, in certain instances, enable the platform 119 to group images captured among multiple devices associated with the single user. For example, mobile devices 101 associated with members of a family visiting a theme park can group pictures of the members of the family even if the members are located in different locations within the theme park.

Once the user is registered, the location-based imaging platform 119 enables the user, per step 603, to generate a user profile specifying preferences including whether to take still pictures, videos, or both; whether to automatically take pictures or wait for manual triggering by the user; the number of pictures or length of the video; favorite locations within the fixed geographical area 105; compilation templates to use; delivery mechanism; delivery format; period for capturing images; etc. The user profile may also include the earlier described user profile information, e.g., username, password, account information, billing information, configuration information, and the like.

After generating a user profile, location-based imaging platform 119 stores the user profile to, for instance, a list of subscribers to the location-based imaging service of system 100, as well as a list of subscriber device identifiers, authentication information, and user-defined profile(s) to user profiles database 123, per step 605. It is contemplated that platform 119 may store or synchronize this information to a memory of, for instance, platform 119, one or more memories of the mobile device 101, or any other suitable storage location of system 100. Further, it is contemplated that users may directly interact with one or more of these storage locations or facilities, such as user profiles database 123.

At step 607, the platform 119 may receive positional information (e.g., real-time or cached positional information) from the mobile device 101 associated with user to initiate the location-based imaging service. If the positional information indicates that the mobile device 101 is within the fixed geographical area 105, the platform 119 initiates reception and tracking of the user's positional information within the fixed geographical area 105 for activating the location-based imaging service (step 609). If the positional information of the mobile device 101 indicates that the mobile device 101 is outside of the fixed geographical area 105, the platform 119 ends reception and tracking of the user's positional information (step 611). In this way, the location-based imaging service is active only when the mobile device 101 is within the fixed geographical area 105 or when the mobile transmits positional information to the platform 119. Such tracking mechanism can also be utilized for the mobile camera 106.

Figure 7A:
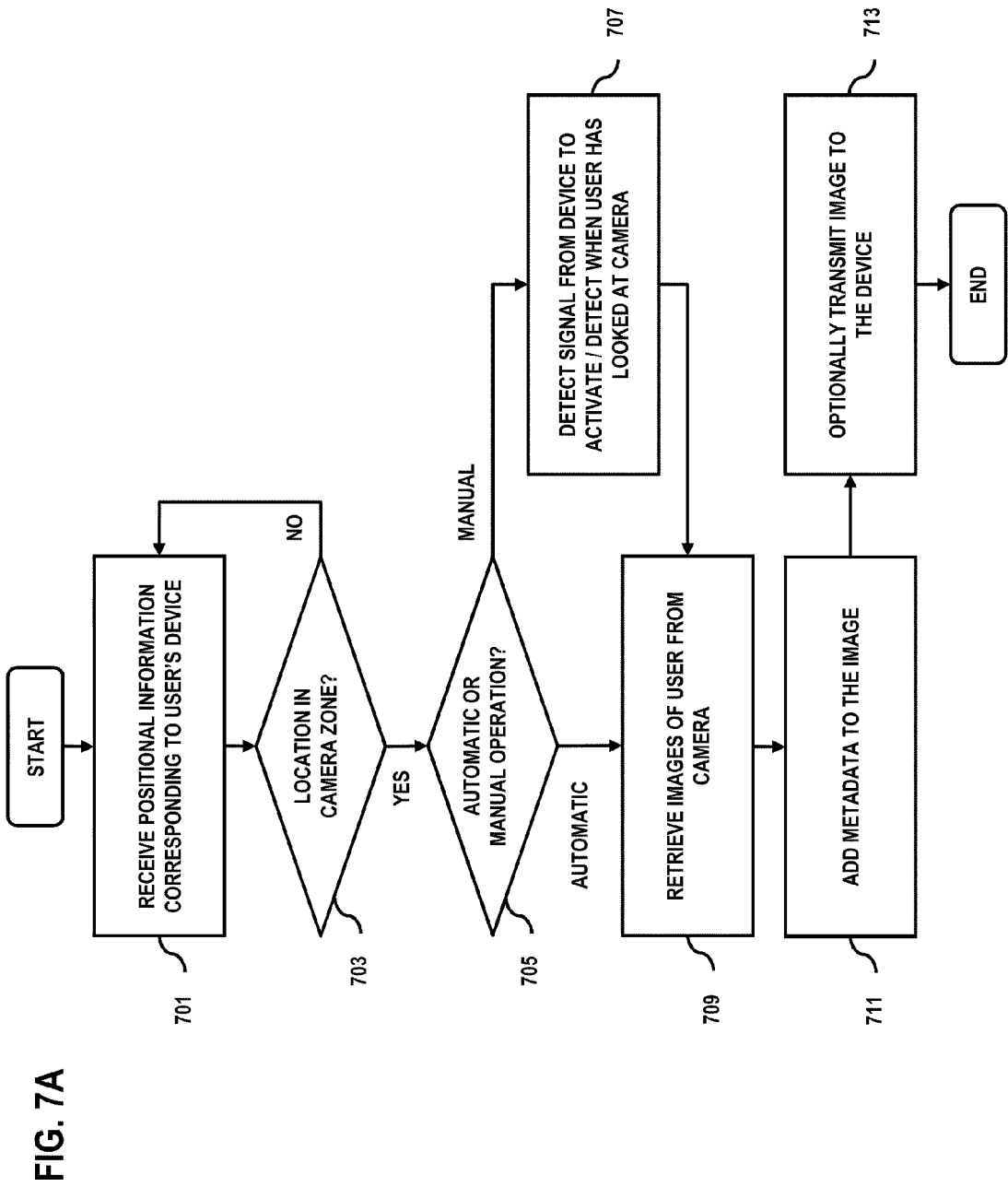
FIG. 7A is a flowchart of a process for providing automatic location-based imaging, according to an exemplary embodiment.

FIG. 7A is a flowchart of a process for providing automatic location-based imaging, according to an exemplary embodiment. For illustrative purposes, the process of FIG. 7 assumes that the service provider has completed the process of FIG. 5 to prepare the fixed geographical area 105 for providing a location-based imaging service and the user has completed the process of FIG. 6 to subscribe to and initiate the service. In step 701, the location-based imaging platform 119 receives positional information corresponding to a location of the mobile device 101 associated with the user. In one embodiment, the positional information is received at predetermined intervals ranging from continuous to any frequency specified by the user or the service provider (e.g., once every 1 second, 5 seconds, 10 seconds, 30 seconds, etc.). In another embodiment, the positional information may be transmitted manually from the mobile device 101 to the platform 119 at the user's request.

On receiving the positional information from the mobile device 101, the platform 119 determines whether the location of the mobile device 101 is within one or more camera zones 103 of the fixed geographical area 105 (step 703). If the mobile device 101 is within one or more camera zones 103, the platform 119 determines from, for instance, the user profile associated with the mobile device 101 whether the location-based imaging service should be operated in an automatic mode, manual mode, or both (step 705). If the service is to be operated in a manual mode, the platform 119 waits to detect a signal from the mobile device 101 to activate the pre-positioned camera or cameras within the camera zone 103 (step 707). In addition or alternatively, the platform 119 may detect a triggering signal by determining whether the user associated with the mobile device 101 has looked at the pre-positioned camera within the camera zone for a predetermined period of time. Such detection can be performed using, for instance, the facial recognition module 305 of the platform 119.

If the platform 119 is configured to operate in an automatic mode or both an automatic and manual mode simultaneously, the platform 119 initiates retrieval of images of the user from the positioned camera or cameras within the camera zone 103 according to the user profile associated with the mobile device 101 (step 709). In one embodiment, retrieval may include either activating the camera or requesting images from a memory storage or image database associated with the camera. For example, the user profile may direct the camera to take a certain number of still pictures of the user while the mobile device is within the camera zone 103. If the user profile specifies capturing images as video segments, the platform 119 may activate the video camera whenever the mobile device 101 is within the corresponding camera zone 103. In another embodiment, the camera may be automatically activated based on facial recognition. For example, the still or video camera will automatically capture images of the user, for instance, when the user's face is visible, when the user is smiling, when the user is looking at the camera, etc. In other embodiments, the camera may operate continuously to record images, and the platform need not activate the camera.

After capturing the image, the platform 119 adds metadata to the images (step 711). As described previously, metadata adds descriptive information (e.g., location, date, time, etc.) to the image to enable, for instance, querying and sorting. The platform 119 can also optionally transmit the captured images or a subset of the captured images to the mobile device 101 immediately or within a predetermined time period of capturing the image (step 713). The preferences and configuration for transmitting images (e.g., which images and what formats, etc.) can be specified in the user profile associated with the mobile device 101.

Figure 7B:
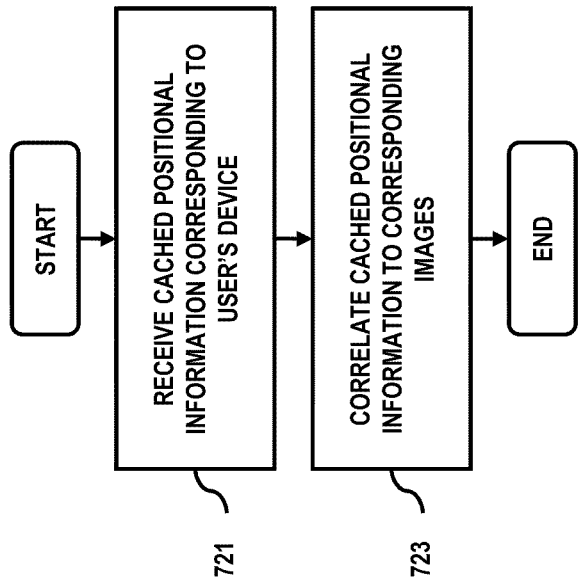
FIG. 7B is a flowchart of a process for providing automatic location-based imaging based on cached location information, according to an exemplary embodiment.

FIG. 7B is a flowchart of a process for providing automatic location-based imaging based on cached location information, according to an exemplary embodiment. The process of FIG. 7B describes an embodiment of the system 100 in which positional information is provided in non-real time. In step 721, the location-based imaging platform 119 receives cached (e.g., non-real time) positional information corresponding to the location of the mobile device 101 collected over a period of time. By way of example, when operating in a cached mode, the mobile device 101 tracks and stores its location information locally at the mobile device without simultaneously transmitting the location-based imaging platform 119. The mobile device can then transmit the cached location information to the platform 119 at the end of the user's visit to the fixed geographical area 105 or at predetermined scheduled (e.g., every hour).

On receipt of the cached positional information, the platform 119 correlates the route and timing of the route contained in the positional information associated with images captured by the various cameras in the camera zones 103. In one embodiment, when the mobile device 101 is operating is a cached mode, the camera zones 103 may operate in an automatic or continuous mode whereby images are captured continuously or periodically by the cameras. The platform 119 stores the automatically captured images and then compares the cached positional information against the locations and times associated with the captured images to correlate the images containing the user of the mobile device 101 to the cached positional information (step 723). For example, the platform 119 identifies the camera zones 103 corresponding to the cached positional information and retrieves the images captured in those zones 103 based on the known positions of the cameras. The positions of cameras are stored with positional attributes indicating, for instance, the location (e.g., GPS coordinates, height, etc.) as well as camera attributes such as pan, zoom, tilt, focus, crest of field, etc. The platform 119 can then use these stored attributes to compare against the cached positional information to select images or sounds that include the user. In addition or alternatively, the platform 119 may employ facial and/or audio recognition to identify images of user of the mobile device 101 from among the captured images.

Figure 8:
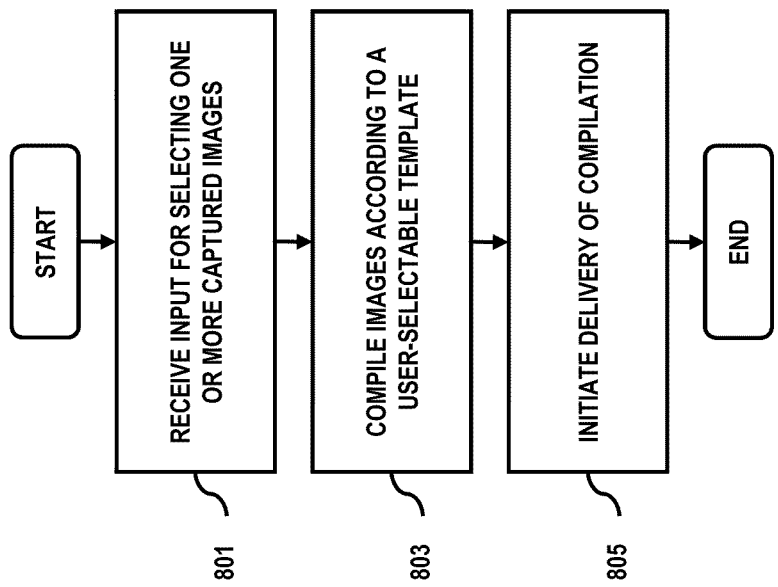
FIG. 8 is a flowchart of a process for compiling images captured using a location-based imaging service, according to an exemplary embodiment.

FIG. 8 is a flowchart of a process for compiling images captured using a location-based imaging service, according to an exemplary embodiment. The process of FIG. 8 assumes that the location-based imaging platform 119 has completed an image capturing sessions per the process of FIG. 7 and is ready to compile the captured images. In step 801, the location-based imaging platform 119 receives input from a user for selecting one or more of the images of the user that has been captured by the platform 119. In one embodiment, the input may specify particular images based on previewing the set of captured images. In addition or alternatively, the input may specify search terms for selecting captured images by querying the metadata associated with the captured images. In yet another embodiment, the platform 119 may select pictures based on preferences specified in the user profile associated with the mobile device 101. In some cases, an input for selecting one or more images need not be made. In which case, the platform 119 can assume that the user would like a compilation of all captured images.

The platform 119 then compiles the selected images for presentation to the user according to a user-selectable template (step 803). In one embodiment, the compilation is a movie incorporating the selected images into the selected template. If the captured images are primarily still photography, the compilation can instead be a slideshow created according to a template. The template may be selected in the user profile or at the time the pictures are selected for compilation. As discussed previously, the template provides a structure for organizing the captured images into a polished presentation. The template can present the images in a variety of styles and formats including those created by celebrities including, e.g., famous directors or cinematographers. In addition, the template can include narration, music, sound effects, graphics, special effects, closed captioning, and the like.

After compiling the images, the platform 119 initiates delivery of the compilation to the user (step 805). The mechanism and format for delivery can be specified by the user profile or by the user. By way of example, the mechanism of delivery can include both physical mechanism (e.g., creating a DVD or CD-ROM of the compilation) or electronic delivery (e.g., transmitting the compilation to the mobile device 101, posting the compilation to a website for download by the user, E-mailing the compilation, etc.).

Figure 9:
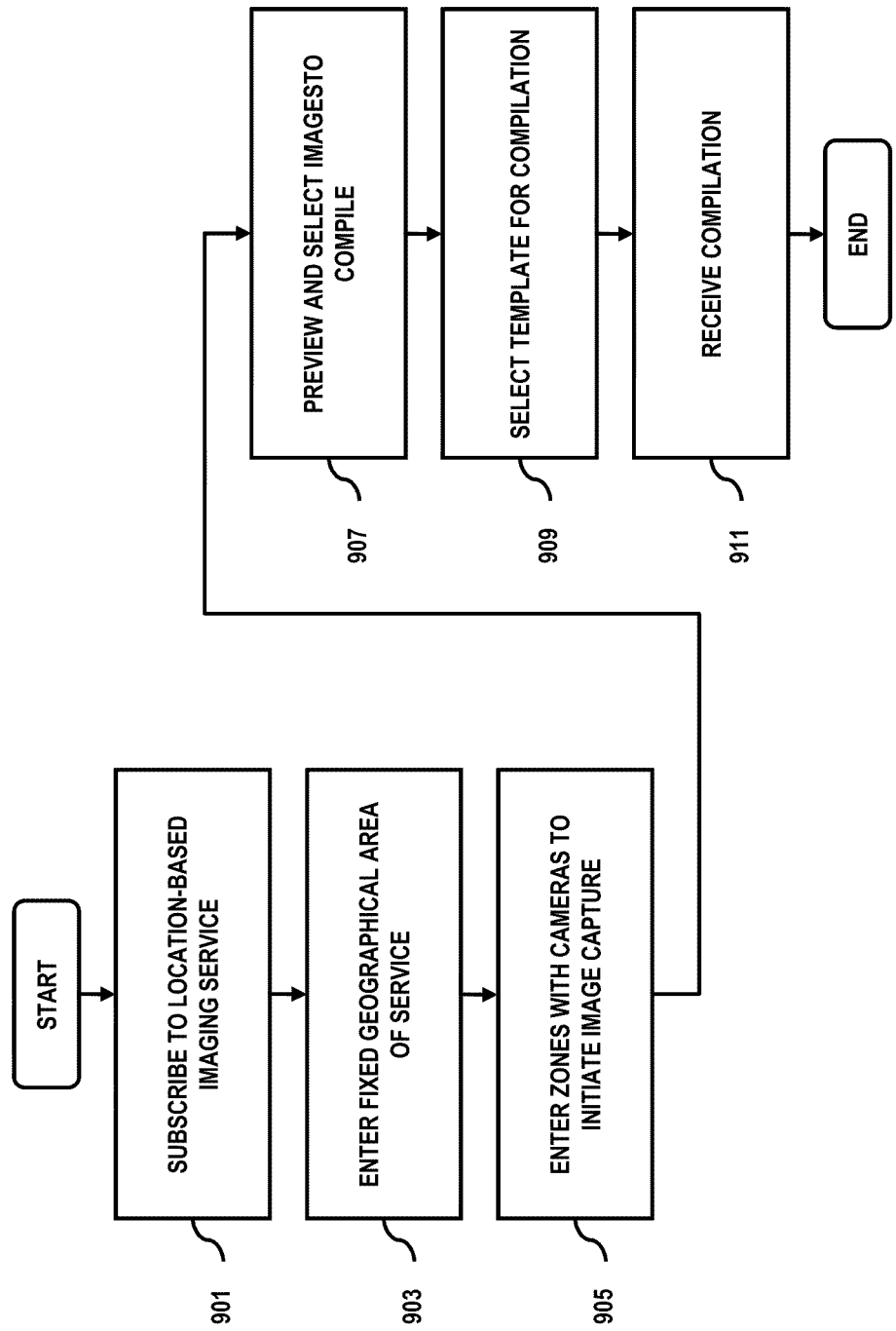
FIG. 9 is a flowchart of a process for using a location-based imaging service, according to an exemplary embodiment.

FIG. 9 is a flowchart of a process for using a location-based imaging service, according to an exemplary embodiment. The process of FIG. 9 illustrates using a location-based imaging service from the perspective of a user. In step 901, the user initiates the location-based imaging service by subscribing to the service. For example, the user arranges with the service provider to subscribe to the location-based imaging service when visiting a fixed geographical area 105 (e.g., a theme park) in which such service is available. Subscribing to the service includes, for instance, creating an account with the service provider, arranging for payment, verifying the compatibility of the user's mobile device 101 with the service, creating a user profile, specifying preferences and configuration, etc.

After subscribing to the service, the user enters the fixed geographical area 105 associated with the service (step 903). In one embodiment, the location-based imaging platform 119 automatically initiates the location-based imaging service when the platform 119 determines that the mobile device 101 associated with the user has entered the area 105. In other embodiments, the user may manually initiate the service when the user enters the fixed geographical area 105 by actuating a command (e.g., a button, menu selection, movement) on the mobile device 101. Within the fixed geographical area 105, the user may enter and exit various camera zones 103 as the user moves throughout the area 105 (step 905). At the same time, the platform 119 tracks the mobile device 101 using positional information from the mobile device 101 to determine when the mobile device 101 enters a camera zone 103. Additionally, platform 119 tracks movement of the mobile camera 106 with respect to the mobile device 101. By entering the camera zone 103 or the zone of the mobile camera 106, the mobile device 101 initiates activation of the pre-positioned camera or cameras within the zones to capture an image of the user associated with the mobile device 101. The image capturing session continues as the user and corresponding mobile device 101 travel within the fixed geographical area 105. In one embodiment, the user can end the session by exiting the fixed geographical area 105 or when a predetermined time period has expired or a predetermined number of images have been captured.

At the end of the image capturing session, the user may access the platform 119 (e.g., via the mobile device 101, server 121, a web portal, or the like) to preview the captured images and selected the images to compile (step 907). As discussed above, the user may select pictures individually or by specifying one or more queries of the metadata associated with the pictures. For example, the user may specify that the compilation should only include images captured on a specific theme park ride. If the user makes no selection, the platform 119 can default to selecting all of the captured images for compilation. In addition, the user can select the template for creating the compilation (step 909). After the platform 119 completes the compilation, the user will receive the compilation according to user-specified delivery preferences (step 911).

The processes described herein for providing automatic location-based imaging may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
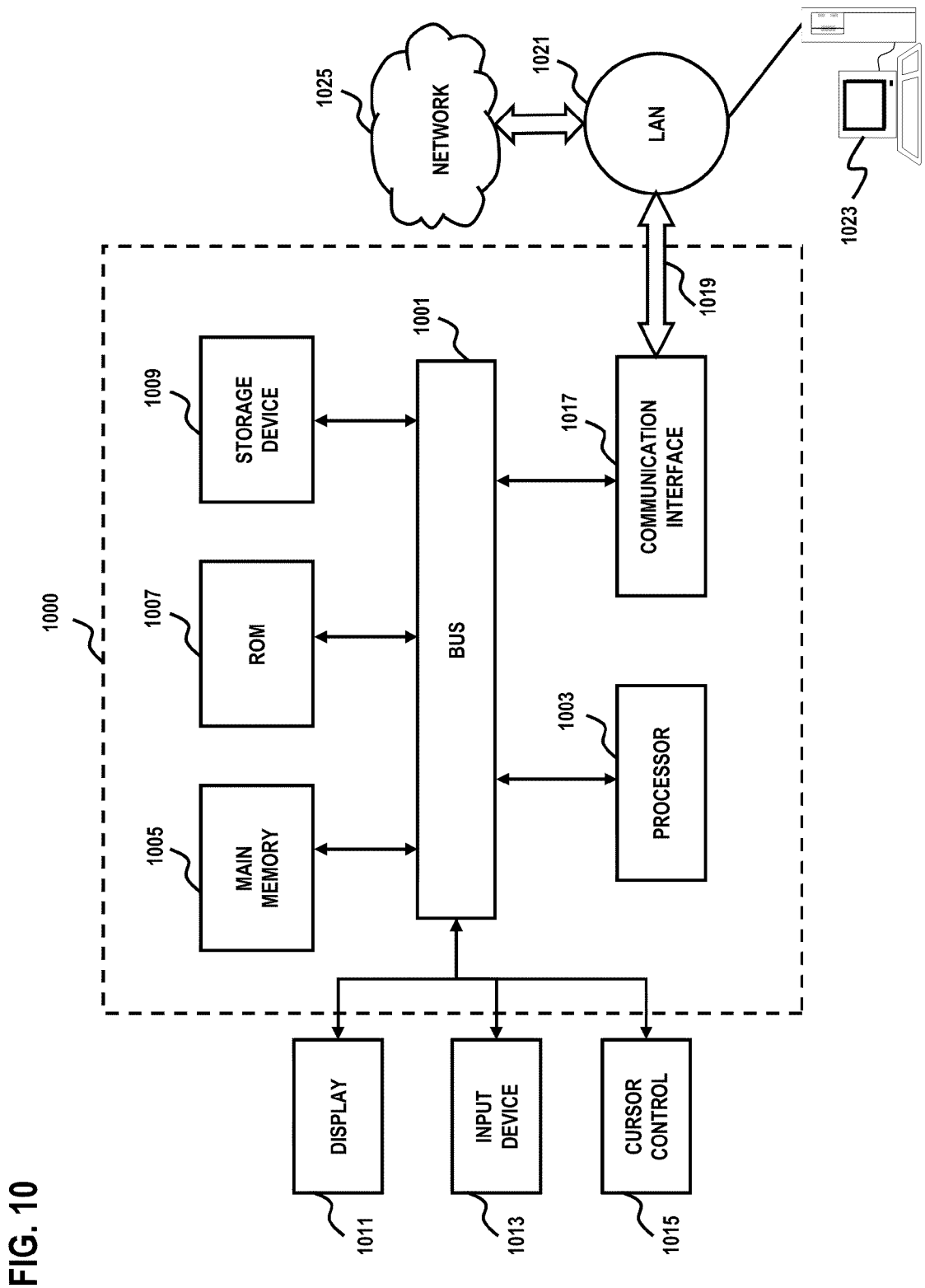
FIG. 10 is a diagram of a computer system that can be used to implement various exemplary embodiments.

FIG. 10 illustrates computing hardware (e.g., computer system) 1000 upon which an embodiment according to the invention can be implemented. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to an embodiment of the invention, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement the embodiment of the invention. Thus, embodiments of the invention are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an embodiment of the invention through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 11:
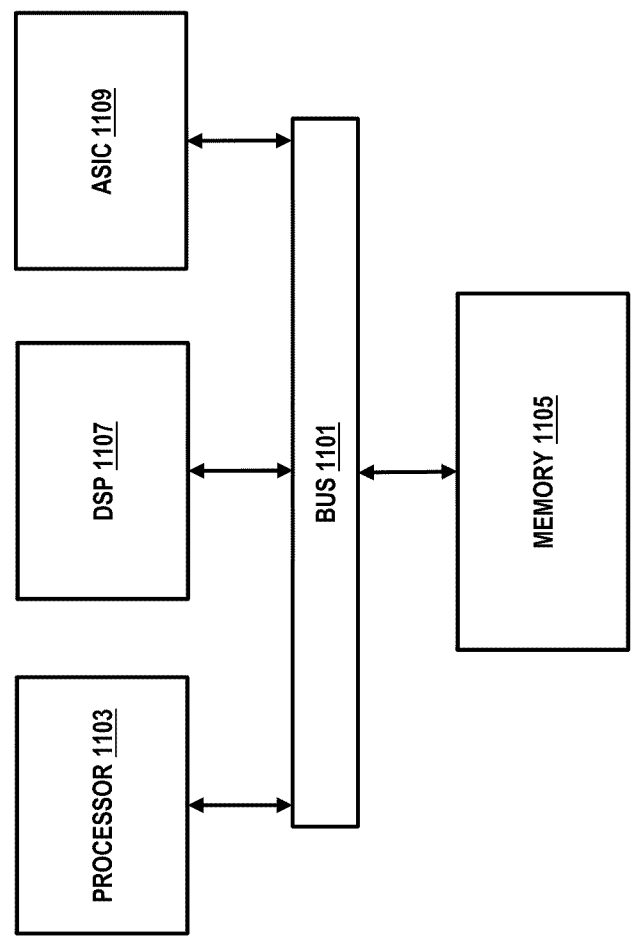
FIG. 11 is a diagram of a chip set that can be used to implement various exemplary embodiments.

FIG. 11 illustrates a chip set or chip 1100 upon which an embodiment of the invention may be implemented. Chip set 1100 is programmed to enable advertisers to correlate a communication session with the amount of consumption of the advertisement by a viewer as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of automatic location-based imaging.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to enable advertisers to correlate a communication session with the amount of consumption of the advertisement by a viewer. The memory 1105 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   receiving, by a device, location information from a mobile device associated with a user;
   determining, by the device and based on the received location information, user positional information of the user;
   instructing, by the device, a camera to capture one or more images, in a manual image capture mode, of the user, independent of the user positional information, by employing facial recognition to detect that the user has entered a zone of the camera and that the user has looked at the camera for a predetermined period of time,
      the camera being located within a fixed geographical area that includes the zone;
   identifying, by the device and based on employing the facial recognition, at least one image of the one or more images of the user; and
   automatically transmitting, by the device and within a particular period of time, the identified at least one image to the mobile device,
      the particular period of time being based on respective time information associated with capturing each image of the identified at least one image.

2. The method of claim 1, further comprising:
   initiating, in an automatic image capture mode and when the mobile device enters the fixed geographical area, reception of the user positional information;
   initiating image capture based at least on a determination that the mobile device has entered the zone and that a user profile, of the user, is stored in a database,
      the user profile including policies for capturing images;
   correlating the user positional information with camera positional information of the camera;
   retrieving the one or more images from the camera based on the correlation; and
   terminating the image capture when the mobile device exits the fixed geographical area.

3. The method of claim 1, further comprising:
   compiling the identified at least one image to create a compiled set of images.

4. The method to of claim 3, further comprising:
   initiating, based on a user response to a query, transmission of the compiled set of images to the mobile device.

5. The method of claim 2 where the user positional information is received in real time.

6. The method of claim 1, further comprising:
   adding metadata to the one or more images,
      where the metadata includes at least one of:
         location information,
         particular attraction information,
         date information, or
         time of day information.

7. The method of claim 1, where the one or more images are still images or video sequences.

8. An apparatus comprising:
   a memory to store instructions; and
   at least one processor to execute the instructions to:

receive location information from a mobile device associated with a user;

determine, based on the received location information, user positional information of the user;

instruct a camera to capture one or more images, in a manual image capture mode, of the user, independent of the user positional information, by employing facial recognition to detect that the user has entered a zone of the stationary camera and that the user has looked at the camera for a predetermined period of time, the camera being located within a fixed geographical area that includes the zone;

identify, based on employing the facial recognition at least one image of the one or more images of the user; and automatically transmit, within a particular period of time, the identified at least one image to the mobile device, the particular period of time being based on respective time information associated with capturing each image of the identified at least one image.

9. The apparatus of claim 8, where the at least one processor is further to:

initiate, in an automatic image capture mode and when the mobile device enters the fixed geographical area, reception of the user positional information;

initiate image capture based at least on a determination that the mobile device has entered the zone and that a user profile, of the user, is stored in a database, the user profile including policies for capturing images;

correlate the user positional information with camera positional information of the camera;

retrieve the one or more images from the camera based on the correlation; and terminate the image capture when the mobile device exits the fixed geographical area.

10. The apparatus of claim 8, where the at least one processor is further to:

compile the identified at least one image to create a compiled set of images.

11. The apparatus of claim 10, where the at least one processor is further to:

initiate, based on a user response to a query, transmission of the compiled set of images to the mobile device.

12. The apparatus of claim 9, where the user positional information is received in real time.

13. The apparatus of claim 8, where the at least one processor is further to:

add metadata to the one or more images,
where the metadata includes at least one of:
location information,
particular attraction information,
date information, or
time of day information.

14. The apparatus of claim 8, where the one or more images are still images or video sequences.

15. A non-transitory computer-readable medium storing instructions, the instructions comprising:

one or more instructions which, when executed by a processor, cause the processor to:

receive location information from a mobile device associated with a user;

determine, based on the received location information, user positional information of the user;

instruct a camera to capture one or more images, in a manual image capture mode, of the user, independent of the user positional information, by employing facial recognition to detect that the user has entered a zone of the camera and that the user has looked at the camera for a predetermined period of time, the camera being located within a fixed geographical area that includes the zone;

identify, based on employing the facial recognition, at least one image of the one or more images of the user; and automatically transmit, within a particular period of time, the identified at least one image to the mobile device, the particular period of time being based on respective time information associated with capturing each image of the identified at least one image.

16. The computer-readable medium of claim 15, where the instructions further include:

one or more instructions to initiate, in an automatic image capture mode and when the mobile device enters the fixed geographical area, reception of the user positional information;

one or more instructions to initiate image capture based at least on a determination that the mobile device has entered the zone and that a user profile, of the user, is stored in a database, the user profile including policies for capturing images;

one or more instructions to correlate the user positional information with camera positional information of the camera;

one or more instructions to retrieve the one or more images from the camera based on the correlation; and one or more instructions to terminate the image capture when the mobile device exits the fixed geographical area.

17. The computer-readable medium of claim 16, where the user positional information is received in real time.

18. The computer-readable medium of claim 15, where the instructions further include:

one or more instructions to compile the identified at least one image to create a compiled set of images.

19. The computer-readable medium of claim 18, where the instructions further include:

one or more instructions to initiate, based on a user response to a query, transmission of the compiled set of images to the mobile device.

20. The computer-readable medium of claim 15, where the instructions further include:

one or more instructions to add metadata to the one or more images,
where the metadata includes at least one of:
location information,
particular attraction information,
date information, or
time of day information.

* * * * *